(12) United States Patent
Sun et al.

(10) Patent No.: US 11,071,399 B2
(45) Date of Patent: Jul. 27, 2021

(54) SHELF SYSTEM

(71) Applicant: BOE TECHNOLOGY GROUP CO., LTD., Beijing (CN)

(72) Inventors: Junmin Sun, Beijing (CN); Pan Ni, Beijing (CN); Lei Cao, Beijing (CN); Yan Ren, Beijing (CN); Zifeng Wang, Beijing (CN); Zhiguo Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 194 days.

(21) Appl. No.: 16/375,832

(22) Filed: Apr. 4, 2019

(65) Prior Publication Data

US 2020/0093288 A1  Mar. 26, 2020

(30) Foreign Application Priority Data

Sep. 21, 2018 (CN) .......................... 201811107719.X (51) Int. Cl.
*G06T 7/73* (2017.01)
*A47F 10/00* (2006.01)
(Continued)

(52) U.S. Cl.
CPC ............ *A47F 10/00* (2013.01); *A47F 5/0018* (2013.01); *A47F 5/16* (2013.01); *G06T 7/74* (2017.01); *A47F 2005/165* (2013.01)

(58) Field of Classification Search
CPC .......... A47F 10/00; A47F 5/0018; A47F 5/16; A47F 2005/165; A47F 5/10;
(Continued)

(56) References Cited

U.S. PATENT DOCUMENTS

2010/0138037 A1* 6/2010 Adelberg ............. G06Q 10/087
700/241
2015/0379366 A1   12/2015 Nomura et al.
(Continued)

FOREIGN PATENT DOCUMENTS

CN          105190655 A    12/2015
CN          107093051 A     8/2017
(Continued)

OTHER PUBLICATIONS

First Chinese Office Action dated Nov. 5, 2019, received for corresponding Chinese Application No. 201811107719.X, 19 pages.

*Primary Examiner* — Ali Bayat
(74) *Attorney, Agent, or Firm* — Kinney & Lange, P.A.

(57) ABSTRACT

A shelf system includes: a shelf body with at least one storage space; an item identification pattern on a horizontal edge of the storage space and extending by a preset length along a length direction of the horizontal edge; an image capture unit configured to obtain image information of the storage space, the image information including the item identification pattern; and a processor configured to, based on the image information, determine storage situation of a matching item that matches the item identification pattern and is stored in a preset placement range in the storage space. The preset placement range is an extension space which is in the storage space and which is defined by a horizontal plane corresponding to an extension range of the item identification pattern by a preset extension length. There is a preset correspondence relationship between the item identification pattern and the matching item.

17 Claims, 2 Drawing Sheets

(51) Int. Cl.
*A47F 5/00* (2006.01)
*A47F 5/16* (2006.01)

(58) Field of Classification Search
CPC .... A47F 2010/025; A47F 5/0043; G06T 7/74; G06K 9/00771; G06K 9/4652; H04N 5/247; H04N 7/181
USPC ......................................................... 382/103
See application file for complete search history.

(56) References Cited

U.S. PATENT DOCUMENTS

| | | | |
|---|---|---|---|
| 2016/0328767 | A1 | 11/2016 | Bonner et al. |
| 2017/0293959 | A1* | 10/2017 | Itou .................... G06K 9/00624 |
| 2019/0149725 | A1* | 5/2019 | Adato ................ H04N 1/32144 348/158 |
| 2019/0213212 | A1* | 7/2019 | Adato .................... G06F 16/235 |
| 2019/0236531 | A1* | 8/2019 | Adato .................... G06Q 10/087 |
| 2019/0279144 | A1 | 9/2019 | Yang et al. |
| 2020/0286032 | A1* | 9/2020 | Bogolea ................. H04N 5/232 |

FOREIGN PATENT DOCUMENTS

| | | |
|---|---|---|
| CN | 107735808 A | 2/2018 |
| CN | 108198052 A | 6/2018 |
| CN | 108416403 A | 8/2018 |
| CN | 108520194 A | 9/2018 |
| JP | 2018099318 A | 6/2018 |

\* cited by examiner

SHELF SYSTEM

CROSS-REFERENCE TO RELATED APPLICATION

This application claims priority to Chinese Patent Application No. 201811107719.X, filed with the Chinese Patent Office on Sep. 21, 2018, which is incorporated herein by reference in its entirety.

TECHNICAL FIELD

The present disclosure relates to the field of smart product technologies, and in particular to a shelf system.

BACKGROUND

Currently, common shelves are simply used to place goods, and cannot dynamic acquire information about items stored on the shelves. Thus, common shelves cannot meet needs of merchants and consumers.

SUMMARY

One embodiment of the present disclosure provides a shelf system including: a shelf body with at least one storage space; an item identification pattern on a horizontal edge of the storage space and extending by a preset length along a length direction of the horizontal edge; an image capture unit configured to obtain image information of the storage space, wherein the image information includes the item identification pattern; and a processor configured to, based on the image information, determine storage situation of a matching item that matches the item identification pattern and is stored in a preset placement range in the storage space. The preset placement range is an extension space which is in the storage space and which is defined by a horizontal plane corresponding to an extension range of the item identification pattern by a preset extension length. There is a preset correspondence relationship between the item identification pattern and the matching item.

Optionally, the processor is specifically configured to, based on the image information, determine whether there is an item different from the matching item in the preset placement range in the storage space; when determining that there is one item different from the matching item, determine that there is a misplaced item in the storage space.

Optionally, the image capture unit is disposed on the shelf body and is located above each storage space.

Optionally, the shelf body includes at least two storage boards that are sequentially arranged from bottom to up; a spacing space between two adjacent storage boards defines the storage space; and the item identification pattern is at a horizontal edge of the storage board below the storage space.

Optionally, there are at least two storage spaces; and the item identification pattern is disposed at the horizontal edge of the storage board below each storage space; the image capture unit is disposed at such a position that the image capture unit is enabled to get image information including each storage space; and the image information including each storage space includes each item identification pattern.

Optionally, every two adjacent storage boards include a first storage board and a second storage board; an orthographic projection of the item identification patterns at the first storage board onto a plane where the second storage board is located, is within an area where the second storage board is located; and the first storage board is located above the second storage board.

Optionally, a bearing surface for placing items of the storage board is inclined downward by a preset angle with respect to the horizontal surface.

Optionally, the preset angle is less than or equal to 45 degrees.

Optionally, the processor is further configured to, based on the image information, when determining that a person takes an item from or puts the item on the shelf body and the item identification pattern on the first storage board and the item identification pattern below the first storage board are blocked while the item identification pattern above the first storage board is not blocked during a taking-and-putting process, determine that the item which is taken or put, is the matching item which matches the item identification pattern on the first storage board.

Optionally, the processor is further configured to, at a preset interval, count a quantity of times each matching item has been taken and a quantity of times each matching item has been put; based on the quantity of times each matching item has been taken and the quantity of times each matching item has been put, for each matching item, count a quantity of items which are currently stored.

Optionally, the processor is further configured to, based on the image information, determine whether there is a vacant area in the preset placement range in the storage space; and determine that the matching item in the preset placement range is out of stock, when determining that there is the vacant area in the preset placement range.

Optionally, in the shelf body, there are two different item identification patterns at the horizontal edge of the identical storage space; there is a preset correspondence relationship between each of the different item identification patterns and each of different matching items; and the image information obtained by the image capture unit includes the two different item identification patterns.

Optionally, the shelf system includes at least two shelf bodies that are arranged side by side; each shelf body includes a storage space at the same height; the storage spaces at the same height in the two adjacent shelf bodies are communicated with each other; each shelf body is provided with one corresponding image capture unit; each image capture unit is configured to obtain image information of the storage space in the corresponding shelf body, as well as image information of the storage space in the shelf body adjacent the corresponding shelf body; the processor is specifically configured to, based on the image information obtained by two adjacent image capture units, determine storage situation of the matching item that matches the item identification pattern and is stored in the preset placement range in the storage space.

Optionally, the item identification pattern has a preset color; there is a preset correspondence relationship between each of item identification patterns of various colors and each of various matching items.

Optionally, the item identification pattern is shown by an electronic shelf label (ESL) or a display panel.

Optionally, the shelf body includes a vertical frame body; each storage board is mounted to the frame body through an adjustment structure.

Optionally, the shelf system further includes a base on the shelf body; and the processor is in the base.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments are merely a part of, rather than all of, the embodiments of the present disclosure, and based on these embodiments, a person skilled in the art may obtain the other embodiments, which also fall within the scope of the present disclosure.

There are two types of smart shelves in the related art. One type of the smart shelves is to mount a camera at a supporting bracket for placing items in each layer of the shelf, use the camera in each layer to capture items on the each layer so as to get in real time stock information of items stored on the supporting bracket and then determine whether there is out of stock. However, the costs of the above smart shelf are increased due to installation of a large number of cameras. Further, the large number of cameras also causes complicated wiring installation. Moreover, it is easy for merchants to encounter the cameras when placing goods on the shelf, which leads to a series of adverse reactions such as a decreased accuracy of product identification. Another type of the smart shelves is to place only one camera on a lateral side of the shelf or on a ceiling for capturing items on the shelf. However, this shelf is limited by installation environment and requires a high distance between two shelves. Meanwhile, when there is a person between two shelves, the only one camera is easily blocked and then information of items stored on the shelf cannot be effectively obtained. In addition, when the merchant moves the shelf, a position of the camera is required to be adjusted correspondingly, and there is a high probability that the camera is required to be reinstalled and fixed. This results in increased costs and inconvenience to the merchant.

In view of that the smart shelves in the related art have deficiencies such as inconvenience in use and more constraints, it is necessary to improve structures of the shelves to accurately get dynamic information about items stored on the shelves and then expand an application range of the shelves.

In order to solve the problems of complicated wiring, being easily blocked and impossible to use a simple structure to accurately obtain the situation of the items on the shelf in the related art due to that many cameras are required or one camera is required to be mounted at a special position for obtaining information of items on the shelf via capturing, one embodiment of the present disclosure provides a shelf system. The shelf system of one embodiment of the present disclosure includes: item identification patterns provided at a shelf body with different items corresponding to different item identification patterns; and an image capture unit used to obtain image information of a storage space including one of the item identification patterns by shooting. In this way, based on the captured image information, even if it is not possible to obtain an image of all items placed on the shelf body corresponding to the item identification pattern, it is possible to monitor storage of items corresponding to the item identification pattern. Thus, the shelf system of one embodiment of the present disclosure can accurately obtain the storage of the items on the shelf with a simple structure without too many cameras.

Figure 1:
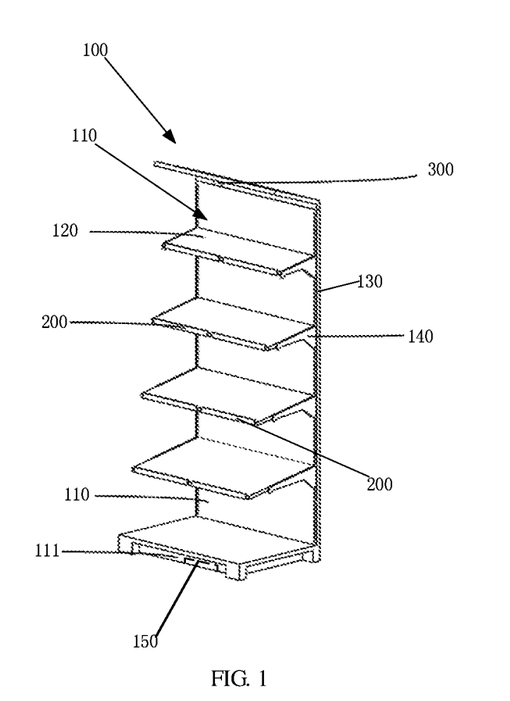
FIG. 1 is a schematic view of a shelf system according to an embodiment of the present disclosure.

FIG. 1 is a schematic view of a shelf system according to an embodiment of the present disclosure. As shown in FIG. 1, the shelf system includes a shelf body 100, an image capture unit 300 and a processor 150.

The shelf body 100 includes at least one storage space 110. An item identification pattern 200 is provided at the shelf body 100 along a horizontal edge of the storage space 110. The item identification pattern 200 extends by a preset length along a length direction of the horizontal edge.

The image capture unit 300 is used to obtain image information of the storage space 110. The image information includes the item identification pattern 200.

The processor 150 is used to, based on the image information, determine storage situation of a matching item that matches the item identification pattern and is stored in a preset placement range in the storage space 110. The preset placement range is an extension space which is in the storage space 110 and which is defined by a horizontal plane corresponding to an extension range of the item identification pattern 200 by a preset extension length. There is a preset correspondence relationship between the item identification pattern 200 and the matching item.

In the shelf system of one embodiment of the present disclosure, the item identification pattern 200 is provided at the shelf body 100 along the length direction of the horizontal edge of the storage space 110, and there is a preset correspondence relationship between the item identification pattern 200 and one matching item. Within the storage space 110, the extension space defined by one horizontal plane corresponding to an extension range of the item identification pattern 200, is a storage region for placing the matching item.

There is a preset correspondence relationship between each of various item identification patterns 200 and each of various matching items. When the shelf body 100 is provided with different item identification patterns 200, the storage spaces 110 corresponding to the different item identification patterns 200 are used to store different items.

Optionally, in one embodiment, the different item identification patterns 200 may be distinguished through colors, i.e., each item identification pattern 200 has a preset color which corresponds one matching item. There is a preset correspondence relationship between the preset color and the matching item. There is a preset correspondence relationship between each of item identification patterns 200 of various colors and each of various matching items.

For example, when the item identification pattern 200 provided at the shelf body 100 along the length direction of the horizontal edge of the storage space 110 is red, there may be a preset correspondence relationship between the red item identification pattern 200 and "table-water". Then, in the storage space 110, an extension space defined by one horizontal plane corresponding to an extension range of the red item identification pattern 200, is a storage region for placing the table-water. When the item identification pattern 200 provided at the shelf body 100 along the length direction of the horizontal edge of the storage space 110 is green, there may be a preset correspondence relationship between the green item identification pattern 200 and "cup". Then, in the storage space 110, an extension space defined by one horizontal plane corresponding to an extension range of the green item identification pattern 200, is a storage region for placing the cup.

Optionally, in one embodiment, the item identification pattern 200 may show a pattern of the matching item, and then different items are distinguished through different patterns shown on the different item identification patterns 200. Alternatively, the item identification pattern 200 may have a preset shape such as a mark shape which can be recognized by the camera. There is a preset correspondence relationship between each of item identification patterns 200 of various shapes and each of various matching items.

Of course, the above forms of the item identification pattern 200 are merely examples and are not limited thereto, as long as the various item identification patterns 200 can be distinguished from each other and can be corresponding to different matching items, respectively.

In one embodiment, optionally, the item identification pattern 200 may be shown by an electronic shelf label (ESL) or a display panel. When the item identification pattern 200 is displayed by the electronic shelf label or the display panel, an identical storage region within the shelf body 100 may be adjusted to be corresponding to different matching items by changing the displayed pattern or shape of the item identification pattern 200, thereby changing the function of this identical storage region and enabling the identical storage region to store a different item. The displayed extension length of one item identification pattern 200 along the shelf body 100 may be changed, thereby changing a range of the storage region in the storage space 110 for the matching item that matches the item identification pattern 200.

In one embodiment, as shown in FIG. 1, the image capture unit 300 includes a camera configured to obtain image information. Specifically, when the image capture unit 300 captures the image information, the image capture unit 300 may get an image every preset time interval, or may also continuously record a video.

In one embodiment, optionally, the image capture unit 300 may be disposed on the shelf body 100 and may be above all of the storage spaces 110.

Furthermore, as shown in FIG. 1, the shelf body 100 includes at least two storage boards 120 that are sequentially arranged from bottom to up. A spacing space between two adjacent storage boards 120 defines the storage space 110. The item identification pattern 200 is disposed at a horizontal edge of the storage board 120 below the storage space 110.

In one embodiment, optionally, there are at least two storage spaces 110 in the shelf body 100. The item identification pattern 200 is disposed at the horizontal edge of the storage board 120 below each storage space 110.

Further, optionally, the storage board 120 below one storage space 110 may be provided with at least two different item identification patterns 200 along the length direction of the storage board 120. The at least two different item identification patterns 200 divide the one storage space 110 into at least two regions for storing different items. Optionally, for the item identification patterns 200 on the same storage board 120, there is a certain gap between adjacent item identification patterns 200, thereby enabling the image capture unit 300 to distinguish regions for storing different items in an identical storage space 110.

In one embodiment, optionally, the image capture unit 300 is disposed at such a position that the image capture unit 300 can get image information of all storage spaces 110 in the shelf body 100, and the image information includes each of the item identification patterns 200 on the shelf body 100.

Specifically, there may be one, two or more image capture units 300, as long as the one, two or more image capture units 300 can capture all the item identification patterns 200 on the shelf body 100.

Figure 2:
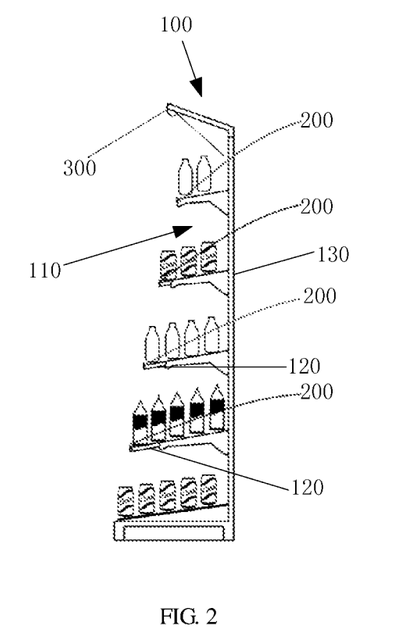
FIG. 2 is a side view of the shelf system according to an embodiment of the present disclosure.
Figure 3:
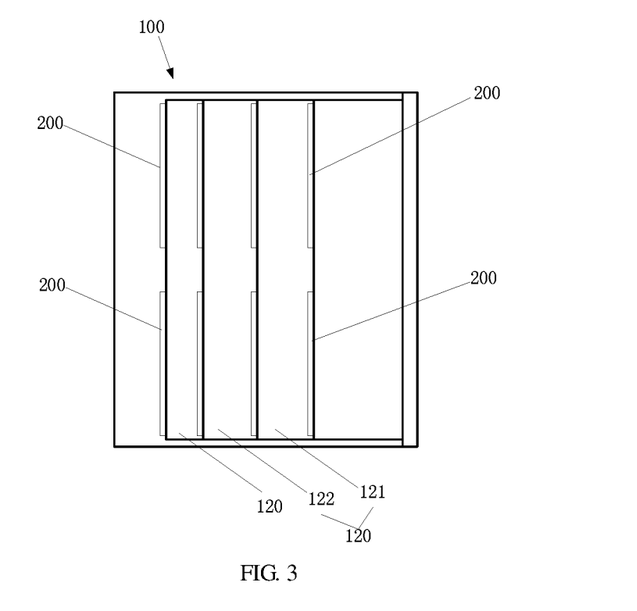
FIG. 3 is a top view of the shelf system according to an embodiment of the present disclosure.

FIG. 2 is a side view of the shelf system according to an embodiment of the present disclosure. FIG. 3 is a top view of the shelf system according to an embodiment of the present disclosure. As shown in FIG. 2 and FIG. 3, in one embodiment, two adjacent storage boards 120 may be referred as a first storage board 121 and a second storage board 122, respectively. An orthographic projection of the item identification patterns 200 at the first storage board 121 onto a plane where the second storage board 122 is located, is within an area where the second storage board 122 is located. The first storage board 121 is located above the second storage board 122.

As shown in FIG. 2 and FIG. 3, each storage board 120 is mounted a vertical frame body 300. For two adjacent storage boards 120, the second storage board 122 is located below the first storage board 121 and extends beyond the first storage board 121 in a direction away from the frame body 130. Then, among the storage boards arranged from up to bottom, each storage board extends beyond its upper storage board in the direction away from the frame body 130.

With the above arrangement, each storage board extends beyond its upper storage board by a certain length, thereby enabling the image capture unit 300 on the shelf body 100 to capture the item identification patterns 200 on each storage board 120. Optionally, the item identification pattern 200 protrudes from the horizontal edge of the storage board 120, thereby enabling the image capture unit 300 to capture an image of the item identification pattern 200.

Based on the above arrangement, each shelf body 100 may be provided with only one image capture unit 300, and an image capture range of the image capture unit 300 includes each item identification pattern 200 on the shelf body 100.

In the above arrangement, when the shelf body 100 is provided with only one image capture unit 300, a width of the storage spaces 110 of the shelf body 100 in an orientation direction of the item identification pattern 200 matches the image capture range of the image capture unit 300. When the width of the storage spaces 110 in the orientation direction of the item identification pattern 200 is greater than or beyond the image capture range of the image capture unit 300, at least two spaced image capture units 300 may be arranged along the orientation direction of the item identification pattern 200, thereby obtaining images of all the item identification patterns 200 on the shelf body 100.

In one embodiment, optionally, as shown in FIG. 2 and FIG. 3, a bearing surface for placing items of the storage board 120 is inclined downward by a preset angle with respect to the horizontal surface. The preset angle is less than or equal to 45 degrees. In this arrangement, the bearing surface for placing items of the storage board 120 is inclined, so that when one item on the storage board 120 is taken away, other items move downwardly towards an end of the storage board 120 adjacent the item identification pattern 200 along the inclined bearing surface of the storage board 120. Then, by capturing an image of the item identification pattern 200, the image capture unit 300 can simultaneously obtain an image of items stored in the corresponding storage space 110.

Optionally, as shown in FIG. 2, the entire storage board 120 is inclined downwardly with respect to the horizontal surface.

In one embodiment, optionally, as shown in FIG. 1, each storage board 120 is mounted to the frame body 130 through an adjustment structure 140. Through the adjustment structure 140, a height of the storage board 120 at the frame body 130 and an inclination angle of the bearing surface with respect to the horizontal surface can be adjusted.

Specifically, one skilled in the art should understand specific implementation manners of the adjustment structure for realizing the above-mentioned adjustment function, and the adjustment structure is not the research focus of the present disclosure and will not be described in detail herein.

In the shelf system of one embodiment of the present disclosure, the processor is coupled with the image capture unit 300. The processor is configured to, based on the image information obtained by the image capture unit 300, determine storage situation of a matching item which matches the item identification pattern 200 and is stored in a preset placement range in the storage space 110.

The preset placement range is an extension space which is in the storage space 110 and which is defined by a horizontal plane corresponding to an extension range of the item identification pattern 200 by a preset extension length. When the image information obtained by the image capture unit 300 includes one item identification pattern 200, the processor can analyze and determine storage situation of items stored in the preset placement range corresponding to the one item identification pattern 200. When the image information obtained by the image capture unit 300 includes several item identification patterns 200, the processor can analyze and determine storage situation of items stored in the preset placement range corresponding to each of the item identification patterns 200.

Specifically, the processor is configured to, based on the image information, determine whether there is an item different from the matching item corresponding to the item identification pattern 200 in the preset placement range in the storage space 110; when determining that there is one item different from the matching item, determine that there is a misplaced item in the storage space.

In the shelf system of one embodiment of the present disclosure, since there is a preset correspondence relationship between each item identification pattern 200 and one matching item, by obtaining in advance the preset correspondence relationships between the item identification patterns 200 and the matching items and extracting an image of items in the preset placement range corresponding to one item identification pattern 200 from the image information, it can be determined that whether the items in the preset placement range are the matching items. When determining that there is one item different from the matching item, it is determined that there is a misplaced item in the preset placement range corresponding to the one item identification pattern 200.

The image information obtained by the image capture unit 300 includes an image of items stored in the storage space 110 and an image of the item identification pattern. For example, when one matching item which has a preset correspondence relationship with one item identification pattern 200 is "table-water", based on the image information obtained by the image capture unit 300, it can be determined that whether the items in the preset placement range corresponding to the item identification pattern 200 include an item which is not the table-water. When the items in the preset placement range corresponding to the item identification pattern 200 include one item which is not the table-water, it is determined that there is a misplaced item in the preset placement range corresponding to the item identification pattern 200. When the items in the preset placement range corresponding to the item identification pattern 200 do not include one item which is not the table-water, it is determined that there is no misplaced item in the preset placement range corresponding to the item identification pattern 200.

In the shelf system of one embodiment of the present disclosure, since the bearing surface for placing items of the storage board 120 is inclined, when one item on the storage board 120 is taken away, other items move downwardly towards an end of the storage board 120 adjacent the item identification pattern 200 along the inclined bearing surface of the storage board 120. Further, positions of the items on the storage board 120 are gradually increased along the inclined bearing surface, thereby enabling the image capture unit 300 to obtain an image of most of the items when the image capture unit 300 captures the image information of the storage space. Then, it can be accurately analyzed whether there is a misplaced item in the storage space.

Specifically, the processor is further configured to, based on the image information, when determining that a person takes an item from or puts the item on the shelf body and the item identification pattern on the first storage board and the item identification pattern below the first storage board are blocked while the item identification pattern above the first storage board is not blocked during the taking-and-putting process, determine that the item which is taken or put, is the matching item which matches the item identification pattern on the first storage board.

Specifically, as shown in FIG. 2 and FIG. 3, among the storage boards arranged from up to bottom, each storage board 120 extends beyond its upper storage board 120, and the item identification pattern for each storage space 110 is disposed at the storage board 120 below the each storage space 110. When taking an item from or putting the item on the shelf body 100, during the taking-and-putting process, the item identification patterns 200 on the various storage boards 120 below the storage space 110 are blocked while the item identification patterns 200 on the various storage boards 120 above the storage space 110 are not blocked. Thus, by analyzing the image information, one first storage board is obtained by determining the item identification patterns 200 which are not blocked and the item identification patterns 200 which are blocked; when the item identification pattern 200 on the first storage board and the item identification pattern 200 below the first storage board are blocked while the item identification pattern 200 above the first storage board is not blocked, then it is determined that the item which is taken or put in this taking-and-putting process, is the item within the storage space above the first storage board, i.e., the matching item which matches the item identification pattern on the first storage board. In this way, the item which is taken or put in this taking-and-putting process can be determined.

It should be understood that in the taking-and-putting process, the image capture unit 300 may get image information at intervals of a preset duration, and it can be determined that whether each taking-and-putting process is a process of putting the item or a process of taking the item by analyzing the image information obtained in a period of time and based on image changes within multi-frame images.

Furthermore, in the shelf system of one embodiment of the present disclosure, when at least two image capture units 300 are provided at a top portion of the shelf body 100 and arranged along the orientation direction of the item identification pattern 200, in order to ensure accurate identification of the item which is taken or put during the taking-and-putting process, the processor may simultaneously obtain the image information obtained by the adjacent capture unit 300, to help determine the item which is taken or put during the taking-and-putting process.

For example, when two hands of one person simultaneously take or put items in different storage spaces 110, by obtaining the image information obtained by the adjacent capture unit 300, the processor can determine that this taking-and-putting process is simultaneously taking or putting items with both hands, and analyze the storage space for each item which is taken or put by each hand.

Optionally, the processor is further configured to, at a preset interval, count a quantity of times each matching item has been taken and a quantity of times each matching item has been put; based on the quantity of times each matching item has been taken and the quantity of times each matching item has been put, count the quantity of the matching items which are currently stored.

Based on the above, the processor can accurately analyze the item which is taken or put during the taking-and-putting process, and whether each taking-and-putting process is a process of putting the item or a process of taking the item. Then the processor can further count at a preset interval the quantity of times each matching item in the preset placement range has been taken and the quantity of times each matching item in the preset placement range has been put. Based on the quantity of times each matching item has been taken and the quantity of times each matching item has been put, when an initial quantity of each matching item is provided, for each matching item, the processor can count the quantity of items which are currently stored, i.e., a quantity of remaining items.

Optionally, the processor is further configured to, based on the image information, determine whether there is a vacant area in the preset placement range in the storage space; and determine that the matching item in the preset placement range is out of stock, when determining that there is the vacant area in the preset placement range.

In the shelf system of one embodiment of the present disclosure, based on the image information obtained by the image capture unit 300, the processor can determine each matching item which is stored in the preset placement range corresponding to each item identification pattern in the storage space 110. Then, when the processor determines that there is the vacant area in the preset placement rang based on the image information, the processor can determine that the matching item which is corresponding to the item identification pattern in the preset placement range is out of stock.

Optionally, when determining that the matching item which is corresponding to one item identification pattern is out of stock, the processor may send a warning message to remind a staff to replenish in time.

Figure 4:
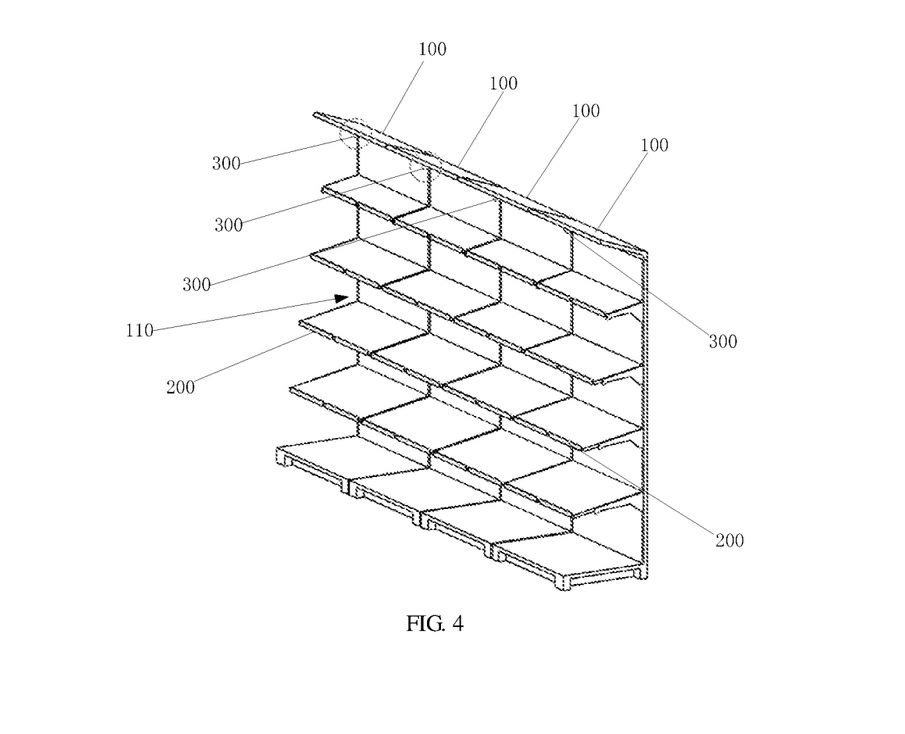
FIG. 4 is a schematic view of a shelf system according to another embodiment of the present disclosure.

As shown in FIG. 4, the shelf system of one embodiment of the present disclosure may include at least two shelf bodies 100 which are arranged side by side. Each shelf body 100 includes a storage space 110 at the same height. In the two adjacent shelf bodies 100, the storage spaces 110 at the same height are communicated with each other.

Each shelf body 100 is provided with one image capture unit 300. Each image capture unit 300 is used to obtain image information of the storage space 110 in the corresponding shelf body 100, as well as image information of the storage space 110 in the shelf body 100 adjacent the corresponding shelf body 100.

The processor is specifically used to, based on the image information obtained by two adjacent image capture units 300, determine storage situation of the matching item that matches the item identification pattern 200 and is stored in the preset placement range in the storage space 110.

Specifically, based on the above, based on the image information obtained by two adjacent image capture units 300, the processor can determine whether there is a misplaced item in the preset placement range corresponding to each item identification pattern 200 in the storage space 110 as well as whether there is out of stock, and/or count the quantity of times each matching item in the preset placement range has been taken and the quantity of times each matching item in the preset placement range has been put.

Further, as shown in FIG. 1, in the shelf system of one embodiment of the present disclosure, the processor may be disposed in a base 111 on the shelf body 100. The base may be slidably mounted on the shelf body 100 in the form of a drawer.

Based on the above, in the shelf system of one embodiment of the present disclosure, the shelf body is provided with the item identification patterns which are corresponding to items in a one-to-one manner, and the preset placement range in the storage space corresponding to one item identification pattern defines the storage region for the matching item corresponding to the one item identification pattern. By using the image capture unit capturing in real time the image information of the storage space corresponding to each item identification pattern, the processor extracts key frames from the image information captured by the image capture unit, and analyzes and determines that whether there is a misplaced item in the preset placement range corresponding to each item identification pattern in the storage space as well as whether there is out of stock.

Further, each storage board extends beyond its upper storage board, thereby enabling the image capture unit on the shelf body to capture the item identification patterns on each storage board.

In addition, since the bearing surface of the storage board is inclined, when one item on the storage board is taken away, other items move downwardly towards an end of the storage board adjacent the item identification pattern along the inclined bearing surface of the storage board, thereby enabling the image capture unit to obtain an image of the items stored in the corresponding storage space when the image capture unit captures the image of the item identification pattern. In this way, based on the image information obtained by the image capture unit, the processor can count the quantity of times each item in the preset placement range corresponding to the item identification pattern has been taken, the quantity of times each item in the preset placement range corresponding to the item identification pattern has been put, and the quantity of remaining items.

Based on the above arrangement, with the help of the item identification pattern, the shelf system of one embodiment of the present disclosure can accurately obtain the storage of the items on the shelf with a simple structure without too many cameras, thereby solving the problems of complicated wiring, being easily blocked and impossible to use a simple structure to accurately obtain the situation of the items on the shelf in the related art due to that many cameras are required or one camera is required to be mounted at a special position for obtaining information of items on the shelf via capturing.

The above are merely the optional embodiments of the present disclosure and shall not be used to limit the scope of the present disclosure. It should be noted that, a person skilled in the art may make improvements and modifications without departing from the principle of the present disclosure, and these improvements and modifications shall also fall within the scope of the present disclosure.

What is claimed is:

1. A shelf system comprising:
a shelf body with at least one storage space;
an item identification pattern on a horizontal edge of the storage space and extending by a preset length along a length direction of the horizontal edge;
an image capture unit configured to obtain image information of the storage space, wherein the image information includes the item identification pattern; and
a processor configured to, based on the image information, determine a storage situation of a matching item that matches the item identification pattern and is stored in a preset placement range in the storage space;
wherein the preset placement range is an extension space which is in the storage space and which is defined by a horizontal plane corresponding to an extension range of the item identification pattern by a preset extension length, and there is a preset correspondence relationship between the item identification pattern and the matching item, and
wherein the image capture unit is disposed at such a position that the image capture unit is able to get image information including each storage space, and the image information including each storage space includes each item identification pattern.

2. The shelf system of claim 1, wherein the processor is specifically configured to, based on the image information:
determine whether there is an item different from the matching item in the preset placement range in the storage space; and
in response to determining that there is an item different from the matching item, determine that there is a misplaced item in the storage space.

3. The shelf system of claim 1, wherein the image capture unit is disposed on the shelf body and is located above each storage space.

4. The shelf system of claim 1, wherein:
the shelf body includes at least two storage boards that are sequentially arranged from bottom to top;
a spacing space between two adjacent storage boards defines the storage space; and
the item identification pattern is at a horizontal edge of the storage board below the storage space.

5. The shelf system of claim 4, wherein:
there are at least two storage spaces; and
the item identification pattern is disposed at the horizontal edge of the storage board below each storage space.

6. The shelf system of claim 5, wherein:
every two adjacent storage boards include a first storage board and a second storage board;
an orthographic projection of the item identification patterns at the first storage board onto a plane where the second storage board is located, is within an area where the second storage board is located; and
the first storage board is located above the second storage board.

7. The shelf system of claim 4, wherein a bearing surface for placing items of the storage board is inclined downward by a preset angle with respect to the horizontal surface.

8. The shelf system of claim 7, wherein the preset angle is less than or equal to 45 degrees.

9. The shelf system of claim 6, wherein the processor is further configured to, based on the image information, in response to determining that a person takes an item from or puts the item on the shelf body and the item identification pattern on the first storage board and the item identification pattern below the first storage board are blocked while the item identification pattern above the first storage board is not blocked during a taking-and-putting process, determine that the item which is taken or put, is the matching item which matches the item identification pattern on the first storage board.

10. The shelf system of claim 9, wherein the processor is further configured to, at a preset interval, count a quantity of times each matching item has been taken and a quantity of times each matching item has been put; and based on the quantity of times each matching item has been taken and the quantity of times each matching item has been put, for each matching item, count a quantity of items which are currently stored.

11. The shelf system of claim 1, wherein the processor is further configured to, based on the image information, determine whether there is a vacant area in the preset placement range in the storage space; and determine that the matching item in the preset placement range is out of stock, when determining that there is the vacant area in the preset placement range.

12. A shelf system comprising:
a shelf body with at least one storage space;
an item identification pattern on a horizontal edge of the storage space and extending by a preset length along a length direction of the horizontal edge;
an image capture unit configured to obtain image information of the storage space, wherein the image information includes the item identification pattern; and
a processor configured to, based on the image information, determine a storage situation of a matching item that matches the item identification pattern and is stored in a preset placement range in the storage space;
wherein:
the preset placement range is an extension space which is in the storage space and which is defined by a horizontal plane corresponding to an extension range of the item identification pattern by a preset extension length, and there is a preset correspondence relationship between the item identification pattern and the matching item;
in the shelf body, there are two different item identification patterns at the horizontal edge of the identical storage space;
there is a preset correspondence relationship between each of the different item identification patterns and each of different matching items; and
the image information obtained by the image capture unit includes the two different item identification patterns.

13. A shelf system comprising:
a shelf body with at least one storage space;
an item identification pattern on a horizontal edge of the storage space and extending by a preset length along a length direction of the horizontal edge;
an image capture unit configured to obtain image information of the storage space, wherein the image information includes the item identification pattern; and
a processor configured to, based on the image information, determine a storage situation of a matching item that matches the item identification pattern and is stored in a preset placement range in the storage space;
wherein:
the preset placement range is an extension space which is in the storage space and which is defined by a horizontal plane corresponding to an extension range of the item identification pattern by a preset extension length, and there is a preset correspondence relationship between the item identification pattern and the matching item;

the shelf system includes at least two shelf bodies that are arranged side by side;

each shelf body includes a storage space at the same height;

the storage spaces at the same height in the two adjacent shelf bodies are communicated with each other;

each shelf body is provided with one corresponding image capture unit;

each image capture unit is configured to obtain image information of the storage space in the corresponding shelf body, as well as image information of the storage space in the shelf body adjacent the corresponding shelf body; and the processor is specifically configured to, based on the image information obtained by two adjacent image capture units, determine storage situation of the matching item that matches the item identification pattern and is stored in the preset placement range in the storage space.

14. The shelf system of claim 1, wherein the item identification pattern has a preset color; and there is a preset correspondence relationship between each of item identification patterns of various colors and each of various matching items.

15. The shelf system of claim 1, wherein the item identification pattern is shown by an electronic shelf label (ESL) or a display panel.

16. The shelf system of claim 7, wherein the shelf body includes a vertical frame body; each storage board is mounted to the frame body through an adjustment structure.

17. The shelf system of claim 1, wherein the shelf system further includes a base on the shelf body; and the processor is in the base.

* * * * *